US005384590A

United States Patent [19]

Sugino

[11] Patent Number: 5,384,590

[45] Date of Patent: Jan. 24, 1995

[54] IMAGE FORMING APPARATUS HAVING FUNCTION FOR AUTOMATICALLY SETTING TRANSFER AND SEPARATION CONDITION

[75] Inventor: Osamu Sugino, Yokohama, Japan

[73] Assignee: Canon Kabushiki Kaisha, Tokyo, Japan

[21] Appl. No.: 66,558

[22] Filed: May 25, 1993

[30] Foreign Application Priority Data

May 28, 1992 [JP] Japan .................................. 4-164332

[51] Int. Cl.[6] ..................... G01D 15/06; G03G 15/044

[52] U.S. Cl. .................................. 346/153.1; 355/217

[58] Field of Search ........................................ 355/217; 346/153.1-160

[56] References Cited

U.S. PATENT DOCUMENTS 4,613,877 9/1986 Spencer et al. ...................... 346/160
5,148,289 9/1992 Nishiyama et al. ............. 346/160 X
5,189,441 2/1993 Fukui et al. ......................... 346/160
5,291,228 3/1994 Tetsuya et al. .................. 346/153.1

*Primary Examiner*—George H. Miller, Jr.
*Attorney, Agent, or Firm*—Robin, Blecker, Daley & Driscoll

[57] ABSTRACT

The present invention provides control means for always maintaining the transfer and separation condition of an image forming apparatus of electrophotographic type. The present invention comprises time detection means for detecting a time period elapsed after a power source of the image forming apparatus is turned OFF, judgement means for judging whether the detected result of the time detection means exceeds a predetermined time, and setting means for setting conditions of the transfer means and/or the separation means, the setting means selecting the conditions of the transfer means and/or the separation means to predetermined conditions when the judged result of the judgement means is out of a predetermined time period and adopting a previous transfer and separation condition when the judged result is in the predetermined time period.

5 Claims, 3 Drawing Sheets

IMAGE FORMING APPARATUS HAVING FUNCTION FOR AUTOMATICALLY SETTING TRANSFER AND SEPARATION CONDITION

BACKGROUND OF THE INVENTION

1. Field of the Invention

The present invention relates to an image forming apparatus such as a copying machine, a laser beam printer and the like. More particularly, it relates to an image forming apparatus wherein a transfer and separation condition can be switched in response to an output of a humidity sensor.

2. Related Background Art

Conventionally, in image forming apparatuses such as copying machines, a toner image formed on a photosensitive drum is generally transferred onto a transfer sheet by a transfer and separation device, and thereafter, the transfer sheet is separated from drum. In this case, a transfer and separation condition for the toner image (for example, a value of current applied to a transfer and separation means) is properly controlled in accordance with the humidity of a place where the image forming apparatus is installed. This is because the quality of the transfer and separation operation for the toner image depends upon the humidity. The humidity is measured by a humidity sensor incorporated into the image forming apparatus.

The humidity sensor is generally arranged on a substrate of a DC controller and the like. However, according to the conventional technique wherein such humidity sensor is arranged on the substrate, a temperature around the substrate is gradually increased by the heat generated by elements constituting the substrate as the time is elapsed after a main switch is turned ON. As a result, even when the external environment (referred to as "installation environment" hereinafter) in which the image forming apparatus is installed is constant, an output level of the humidity sensor is gradually transferred toward a low humidity side. That is to say, regardless of the constant absolute humidity, since the temperature is increased, the absolute humidity detected by the humidity sensor is gradually decreased. Thus, in a mode for controlling the transfer and separation condition on the basis of the humidity successively measured, although the transfer and separation condition suited to the installation environment can be obtained immediately after the main switch is turned ON, since the transfer and separation condition is lowered to a lower humidity side lower than the humidity of the installation environment, it is feared that a solid image (image having a wide area) becomes thin or obscure, thus causing the poor transfer.

On the other hand, in order to eliminate this disadvantage, it is considered that the humidity is measured only when the main switch is turned ON, the transfer and separation condition is determined on the basis of the measured humidity and the value of the determined condition is fixed. In this method, even when the humidity level around the humidity sensor is lowered below the humidity of the installation environment by the increase in the temperature after the main switch is turned ON, the transfer and separation condition matching to the installation environment can be maintained. However, after the main switch is turned OFF, when the main switch is turned ON again before the humidity level around the humidity sensor is returned to the humidity of the installation environment, similar to the above, since the temperature in the image forming apparatus is in the elevated temperature condition, the transfer and separation condition having the humidity lower than the humidity of the installation environment is selected, with the result that it is feared that the transfer void can easily occur.

Incidentally, it is considered that only the humidity sensor is installed at a location which is not influenced upon the temperature increase. However, in this case, it is necessary to add any member for installing the humidity sensor, thus making the installing operation troublesome and making the apparatus expensive.

SUMMARY OF THE INVENTION

An object of the present invention is to provide an image forming apparatus wherein the error selection of the transfer and separation condition due to the difference between an output of a humidity sensor which is influenced upon the heat generated in the image forming apparatus and the actual humidity of the installation environment in which the image forming apparatus is installed can be eliminated, thereby preventing the transfer void.

To achieve the above object, an image forming apparatus having a function for automatically setting a transfer and separation condition according to the present invention comprises an electrophotographic photosensitive member, a developing device for forming a toner image on the photosensitive member, a transfer means for applying an electric field to a transfer sheet to transfer the toner image onto the transfer sheet by an electrostatic force, a separation means for removing the electrostatic force generated in the transfer sheet by the electric field applied to the transfer sheet during a transferring operation, a time detection means for detecting a time period elapsed after a power source of the image forming apparatus is turned OFF, a judgement means for judging whether the detected result of the time detection means exceeds a predetermined time, a setting means for setting conditions of the transfer means and/or the separation means, the setting means selecting the conditions of the transfer means and/or the separation means to predetermined conditions when the judged result of the judgement means is out of a predetermined time period and adopting a previous transfer and separation condition when the judged result is in the predetermined time period.

DETAILED DESCRIPTION OF THE PREFERRED EMBODIMENTS

The present invention will now be explained in connection with embodiments thereof with reference to the accompanying drawings.

Figure 1:
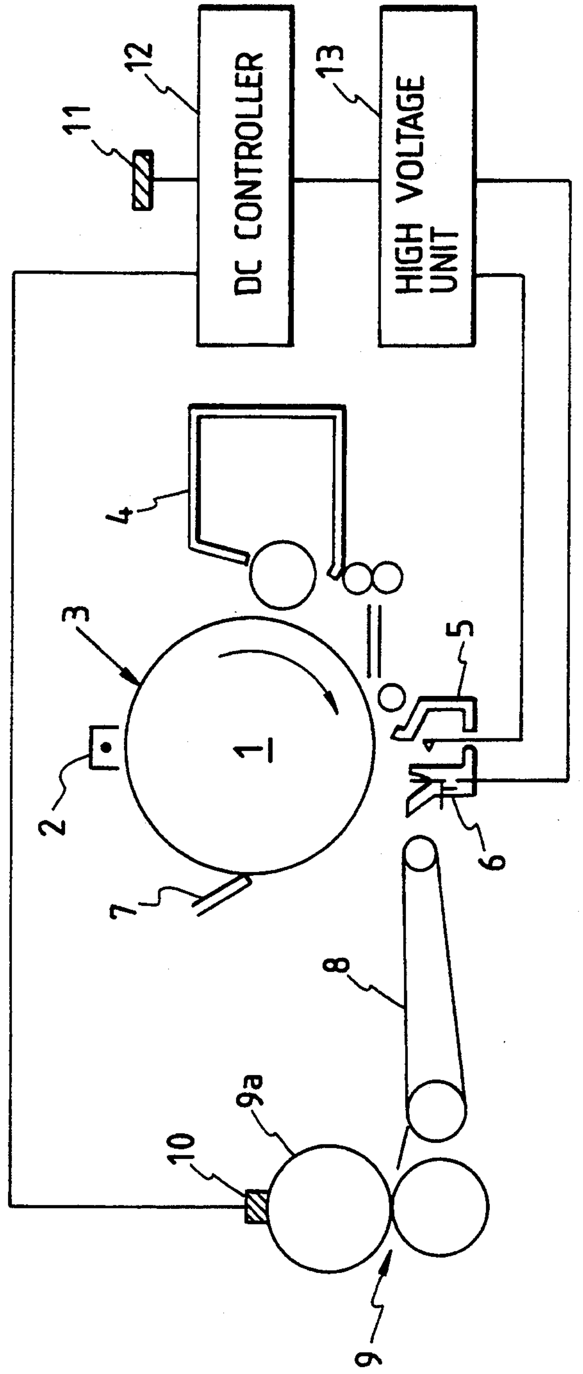
FIG. 1 is a schematic constructural view of an image forming apparatus according to the present invention.
Figure 2:
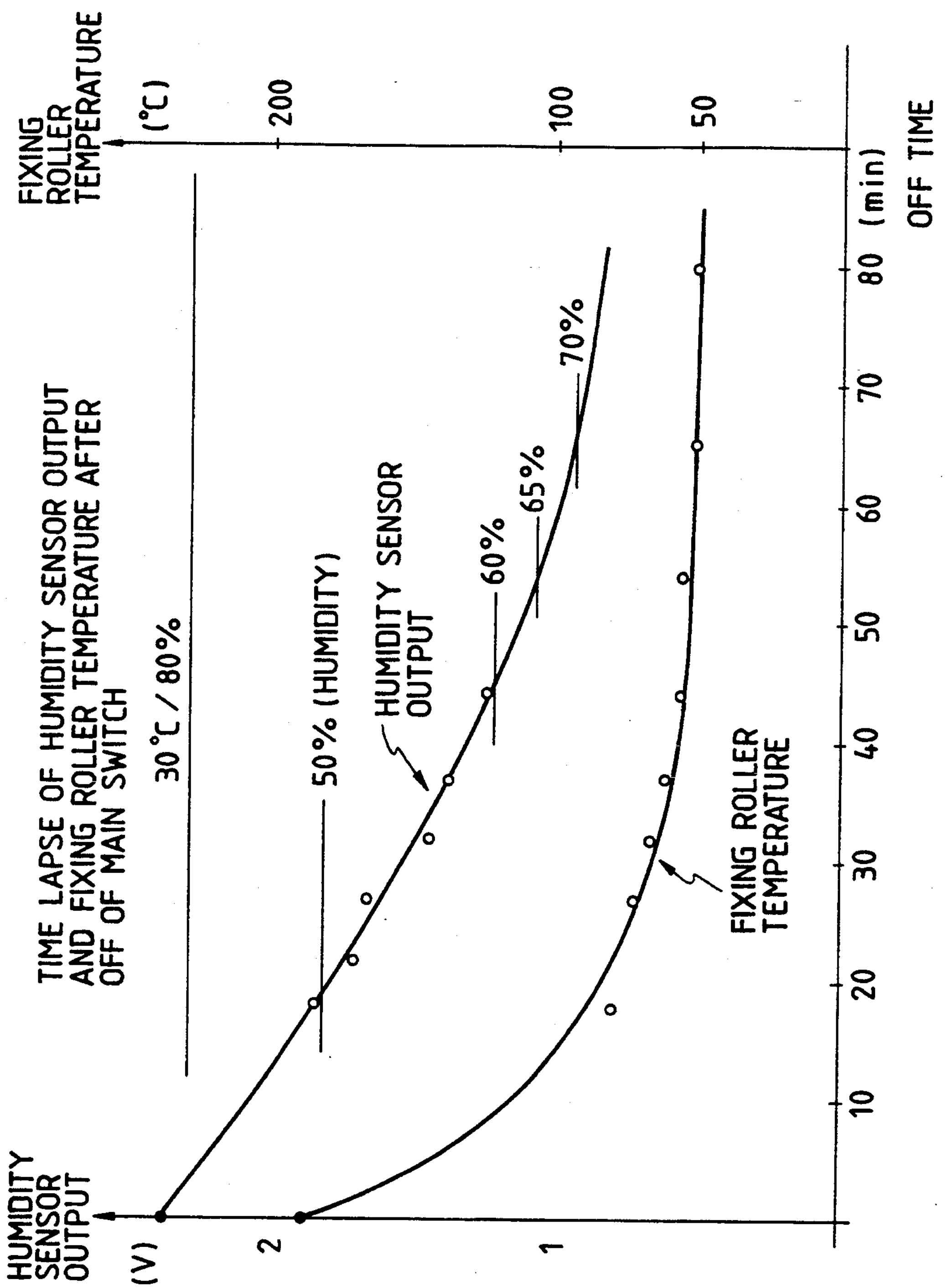
FIG. 2 is a graph showing relations between a humidity sensor output and an OFF time and between a fixing roller temperature and the OFF time.

In FIG. 1 showing a schematic construction of an image forming apparatus according to the present invention, an electrophotographic photosensitive drum 1 as an image bearing member is arranged substantially at a center of the body of the image forming apparatus. Around the photosensitive drum 1, there are arranged in order a charger means 2 and an exposure means 3 as an electrostatic latent image forming means, a developing means 4, a transfer charger 5 and a charge removing separation probe 6 as a transfer/separation means, and a cleaning means 7 along a rotational direction (clockwise direction) of the drum. Further, below the photosensitive drum 1, there are arranged a transfer sheet convey portion 8 and a fixing means 9. A thermistor (temperature sensor) 10 as one member constituting a clock means for measuring time is associated with a fixing roller 9*a* of the fixing means 9, and a humidity sensor 11 is arranged on a substrate of a DC controller 12. The DC controller 12 is connected to the transfer charger 5 and the charge removing separation probe 6 via a high voltage unit 13. Incidentally, the reason why the above-mentioned thermistor 10 can be used as the clock means is that a relation between the temperature of the fixing roller 9*a* measured by the thermistor 10 and a time period (OFF time) elapsed after a main switch is turned OFF is maintained as shown in FIG. 2, and, thus, the OFF time can be reasonably determined from the temperature of the fixing roller 9*a*.

First of all, in a first embodiment, a temperature of the fixing roller 9*a* is measured when the main switch is turned ON. When the temperature of the fixing roller is lower than 50° C., it is judged that the OFF time of the main switch is adequate and the temperature in the image forming apparatus was adequately decreased and the humidity around the humidity sensor 11 was returned to the same level as the humidity of the external environment in which the image forming apparatus is installed, i.e., the installation environment. As apparent from FIG. 2, this is because the OFF time during which the temperature of the fixing roller 9*a* is decreased below 50° C. is substantially equal to the time period during which the output of the humidity sensor 11 is returned to 80%. In this point, the humidity is measured, and the transfer and separation condition is selected in accordance with the following table 1.

TABLE 1

| Humidity | Below 35% | 35 to 70% | Above 70% |
|---|---|---|---|
| Transfer current | 140 μA | 140 μA | 140 μA |
| Charge removing probe current | 90 μA | 60 μA | 45 μA |

Further, when the surface temperature of the fixing roller 9*a* is greater than 50° C., it is judged that the OFF time of the main switch is short and the humidity around the humidity sensor 11 is not yet returned to the humidity level of the external environment, and the previously selected transfer and separation condition is used as it is.

Incidentally, the condition that the temperature is 50° C. according to this embodiment relates to the image forming apparatus according to the illustrated embodiment, and, when the fixing means and/or the DC controller 12 is changed, such condition can be varied. Accordingly, such condition may be appropriately set. This is also true in the following embodiments.

In a second embodiment, a time period during which the temperature of the fixing roller 9*a* reaches 100° C. after the main switch is turned ON is measured, and, for example, when such time period is greater than 10 seconds, it is judged that the OFF time of the main switch is adequate and the humidity around the humidity sensor 11 was returned to the same level as the humidity of the installation environment. At this point, the humidity is measured, and the transfer and separation condition is selected from the above table 1 on the basis of the measured humidity. On the other hand, when the temperature of the fixing roller 9*a* does not reach 100° C., it is judged that the OFF time of the main switch is short and the humidity around the humidity sensor 11 is not yet returned to the humidity level of the external environment, and the previously selected transfer and separation condition is used as it is.

In a third embodiment, the OFF time is actually counted by a timer circuit. When the OFF time is greater than 1.5 hour as the main switch is turned ON, similar to the above first and second embodiments, it is judged that the OFF time of the main switch is adequate, and the transfer and separation condition is selected on the basis of the above table 1. On the other hand, when the OFF time does not reach 1.5 hour, the previously selected transfer and separation condition is used as it is.

Incidentally, the conventional latent image forming means of analogue and digital type can be applied to the electrophotographic image forming portion according to the above-mentioned embodiments. Further, regarding the charger means and the fixing means, various alterations and modifications may be effected.

Figure 3:
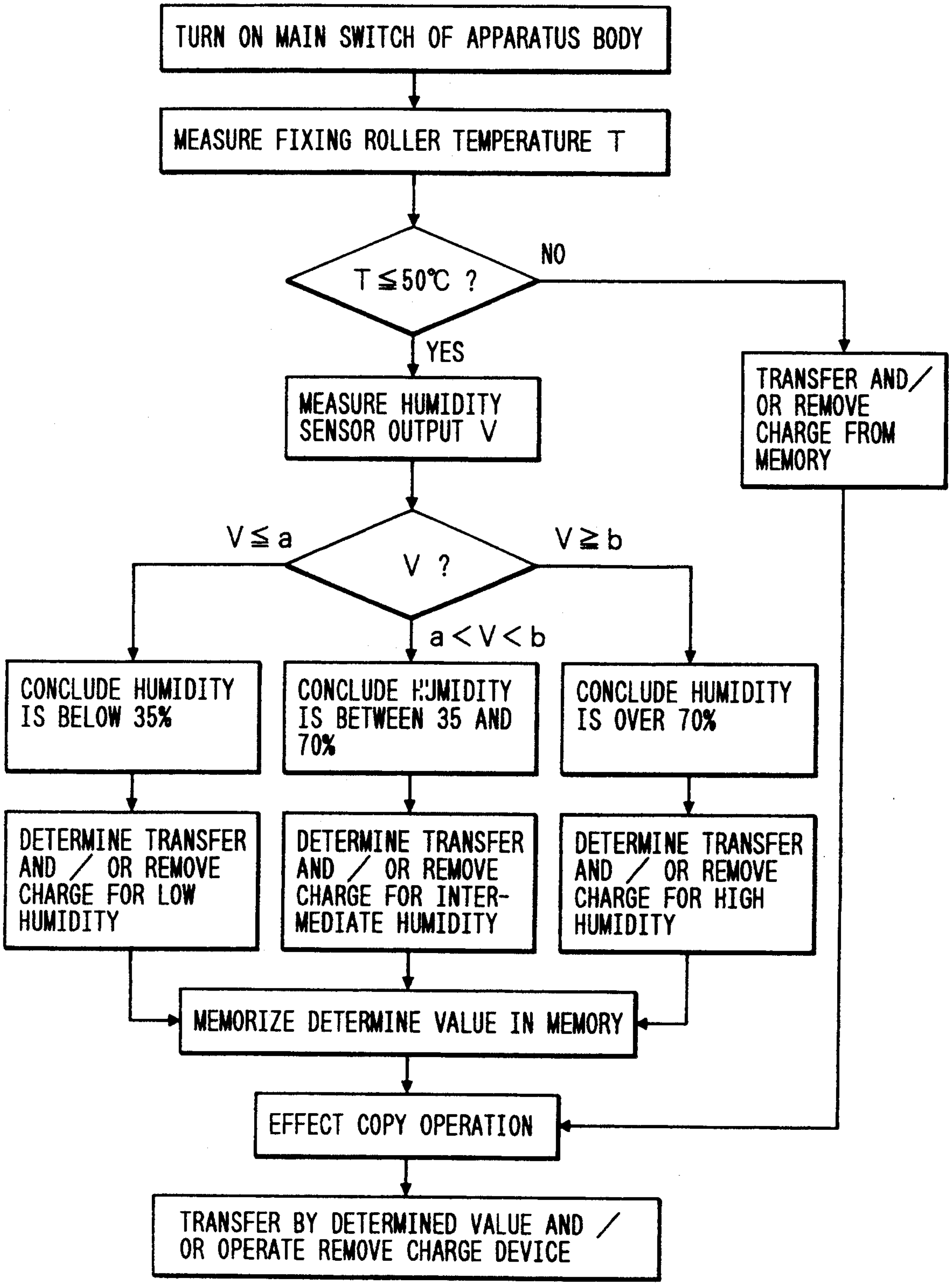
FIG. 3 is a flow chart showing an example of the control for a transfer means and a separation means according to an embodiment.

Incidentally, FIG. 3 is a flow chart showing the control according to the present invention.

As mentioned above, according to the present invention, since the transfer and .separation condition is selected by comparing the measured OFF time of the main switch and the predetermined time, the optimum transfer and separation can be performed even when the humidity is varied.

What is claimed is:

1. An image forming apparatus having a function for automatically setting a transfer and separation condition, comprising:

an electrophotographic photosensitive member;

a developing device for forming a toner image on said photosensitive member;

transfer means for applying an electric field to a transfer sheet to transfer the toner image onto the transfer sheet by an electrostatic force;

separation means for removing the electrostatic force generated in the transfer sheet by the electric field applied to the transfer sheet during a transferring operation;

time detection means for detecting a time period elapsed after a power source of the image forming apparatus is turned OFF;

judgement means for judging whether the detected result of said time detection means exceeds a predetermined time; and setting means for setting conditions of said transfer means and/or said separation means, said setting means selecting the conditions of said transfer means and/or said separation means to predetermined conditions when the judged result of said judgement means is out of a predetermined time period, and adopting a previous transfer and separation condition when the judged result is in the predetermined time period.

2. An image forming apparatus according to claim 1, wherein said time detection means judges the time period on the basis of the change in temperature of fixing means for thermally fixing the toner image to the transfer sheet.

3. An image forming apparatus according to claim 1, wherein said separation means has a charge removing electrode probe means, and a power source for applying a voltage to said electrode probe means.

4. An image forming apparatus according to claim 1, wherein said setting means for setting conditions of said transfer means and/or said separation means sets the condition of said transfer means and the condition of said separation means simultaneously.

5. An image forming apparatus according to claim 1, wherein said time detection means judges the time period by measuring an elapsed time.

* * * * *

UNITED STATES PATENT AND TRADEMARK OFFICE

CERTIFICATE OF CORRECTION

PATENT NO. : 5,384,590

DATED : January 24, 1995

INVENTOR(S) : Osamu Sugino

It is certified that error appears in the above-indentified patent and that said Letters Patent is hereby corrected as shown below:

Col. 1, line 19. After "from" insert -- the --.

Col. 1, line 49. After "the" insert -- measured --.

Col. 1, line 50. Change "lower humidity side" to -- value --.

Col. 1, line 51. Change "feared" to -- possible --.

Col. 1, line 52. Change "becomes" to -- may become --.

Col. 1, line 53. Change "the" to -- a --.

Col. 1, line 62. Change "the" to -- an --. (1st occurrence)

Col. 2, line 3. Change "the" to -- a -- (two occurrences).

Col. 2, line 5. Change "feared" to -- possible -- and change "the" to -- a --. (2nd occurrence)

Col. 2, line 10. Change "any" to -- a --.

Col. 2, line 16. Change "error" to -- erroneous --.

UNITED STATES PATENT AND TRADEMARK OFFICE

CERTIFICATE OF CORRECTION

PATENT NO. : 5,384,590

DATED : January 24, 1995

INVENTOR(S) : Osamu Sugino

It is certified that error appears in the above-indentified patent and that said Letters Patent is hereby corrected as shown below:

Col. 2, line 51. Change "constructural" to -- structural --.

Signed and Sealed this

Thirteenth Day of June, 1995

Attest:

BRUCE LEHMAN

Attesting Officer

Commissioner of Patents and Trademarks